United States Patent [19]

in 't Zandt et al.

[11] Patent Number: 4,869,707

[45] Date of Patent: Sep. 26, 1989

[54] BELT TENSION DEVICE

[75] Inventors: Hubertus W. G. in 't Zandt, Venlo; Martinus H. J. L. M. Broeren, Vortum-Mullem, both of Netherlands

[73] Assignee: OCE-Nederland B.V., Venlo, Netherlands

[21] Appl. No.: 277,857

[22] Filed: Nov. 30, 1988

[30] Foreign Application Priority Data

Dec. 7, 1987 [NL] Netherlands .......................... 87002939

[51] Int. Cl.[4] .......................... F16H 7/08; G03G 15/00

[52] U.S. Cl. .......................................... 474/115; 355/212

[58] Field of Search ................ 474/115, 101, 133, 135, 474/111, 109; 355/3 BE, 14 R, 16

[56] References Cited

U.S. PATENT DOCUMENTS

| | | | |
|---|---|---|---|
| 4,114,536 | 9/1978 | Kaneko et al. | 355/3 BE X |
| 4,183,658 | 1/1980 | Winthaegen | 355/3 BE |
| 4,378,154 | 3/1983 | Hoffman | 355/3 BE X |
| 4,541,709 | 9/1985 | Kampschreur | 355/3 BE X |
| 4,592,641 | 6/1986 | Roelofs et al. | 355/3 BE X |
| 4,630,919 | 12/1986 | Fantuzzo et al. | 355/3 BE X |

*Primary Examiner*—Thuy M. Bui

*Attorney, Agent, or Firm*—Reed Smith Shaw & McClay

[57] ABSTRACT

A belt tensioning device for use in a copying machine. The tension device includes two pairs of levers each lever having a first and second arm. A pair of floating rollers are provided to tension the belt by formation of loops in front of and behind, respectively, of an intermittent contact point between the belt and a pressure element moving at a different speed. Each floating roller is suspended in the ends of the first arms of the respective levers. The end of other arms of one pair of levers is connected to the end of the corresponding second arm of the other pair of levers by a tension spring system. One pair of levers has a larger transmission ratio than the other, so that the floating rollers return to their old positions after contact between the belt and pressure element.

4 Claims, 1 Drawing Sheet

BELT TENSION DEVICE

FIELD OF THE INVENTION

The present invention relates to a tensioning means and, in particular to belt tensioning means for use with apparatus such as photocopiers in which a first moving belt is contacted with a second pressure element so that the belt is driven at the speed of the second element.

BACKGROUND OF THE INVENTION

Belt tensioning means for use in photocopying are know, for example, U.S. Pat. Nos. 4,183,658 and 4,592,641. See also U.S. Pat. No. 4,114,536. In the photocopier disclosed in U.S. Pat. No. 4,183,658, a photoconductive belt on which an image is electrophotographically formed is pressed against an intermediate support in order to transfer the formed image to the support. At the point where the contact pressure is applied, the belt assumes the speed of the intermediate support so that the image transfer can take place without smearing.

In this copier, the intermediate support is driven at a speed slightly less than that of the photoconductive belt so that during the image transfer the loop formed in the belt by a first floating roller in front of the point of contact pressure becomes larger and the loop formed by a second floating roller after contact, becomes smaller. If the contact pressure is eliminated after the image transfer, the second floating roller, which exerts a tensioning force greater than that of the first floating roller, enlarges the loop it forms in the belt after the point of contact and at the same time reduces the loop that the first floating roller forms in the belt in front of the contact point. Thus, after each image transfer the original position of the photoconductive belt with respect to the intermediate support is restored while the belt remains tensioned.

In order to avoid disturbing impacts and vibrations in the belt during the movement of the floating rollers from one position to the other, the difference between the forces exerted by the two floating rollers is preferably controlled to be no larger than the force required to move the rollers and that part of the belt therebetween. Also, the force which each roller exerts separately is preferably made no larger than necessary to keep the associated belt loop sufficiently taut.

One method of controlling such forces has been to use the weight of the floating rollers and/or tension forces produced by springs acting on the floating rollers. However, in practice, difficulties often occur in the operation of such devices due to the cumulative effect of deviations from various components due to accepted manufacturing tolerances which result in imprecise control of the weight on balancing. Accordingly, it is an object of the invention to obviate such difficulties by providing a novel tensioning means.

SUMMARY OF THE INVENTION

Generally, the present invention provides a belt tensioning means in which each of the floating rollers is mounted in associated first arms of a pair of levers each having first and second arms. Each end of the second arms of the one pair is connected to the end of the corresponding second arm of the other pair of levers by means of a tension spring system extending between the pairs of levers. The tensioning means provides a transmission ratio for one pair of levers which differs from the transmission ratio of the other pair.

The forces involved by the tensioning means of the present invention are derived primarily from one tension spring system so that there is no cumulation effect caused by manufacturing tolerance deviations. Also, the floating rollers can be made very light in weight so that very little force is required to move them. Disturbing impacts and vibrations in the belts are thus greatly reduced or eliminated.

Other advantages of the invention will become apparent from a perusal of the following detailed description of a presently preferred embodiment taken in connection with the accompanying drawing.

PRESENTLY PREFERRED EMBODIMENT

Figure 1:
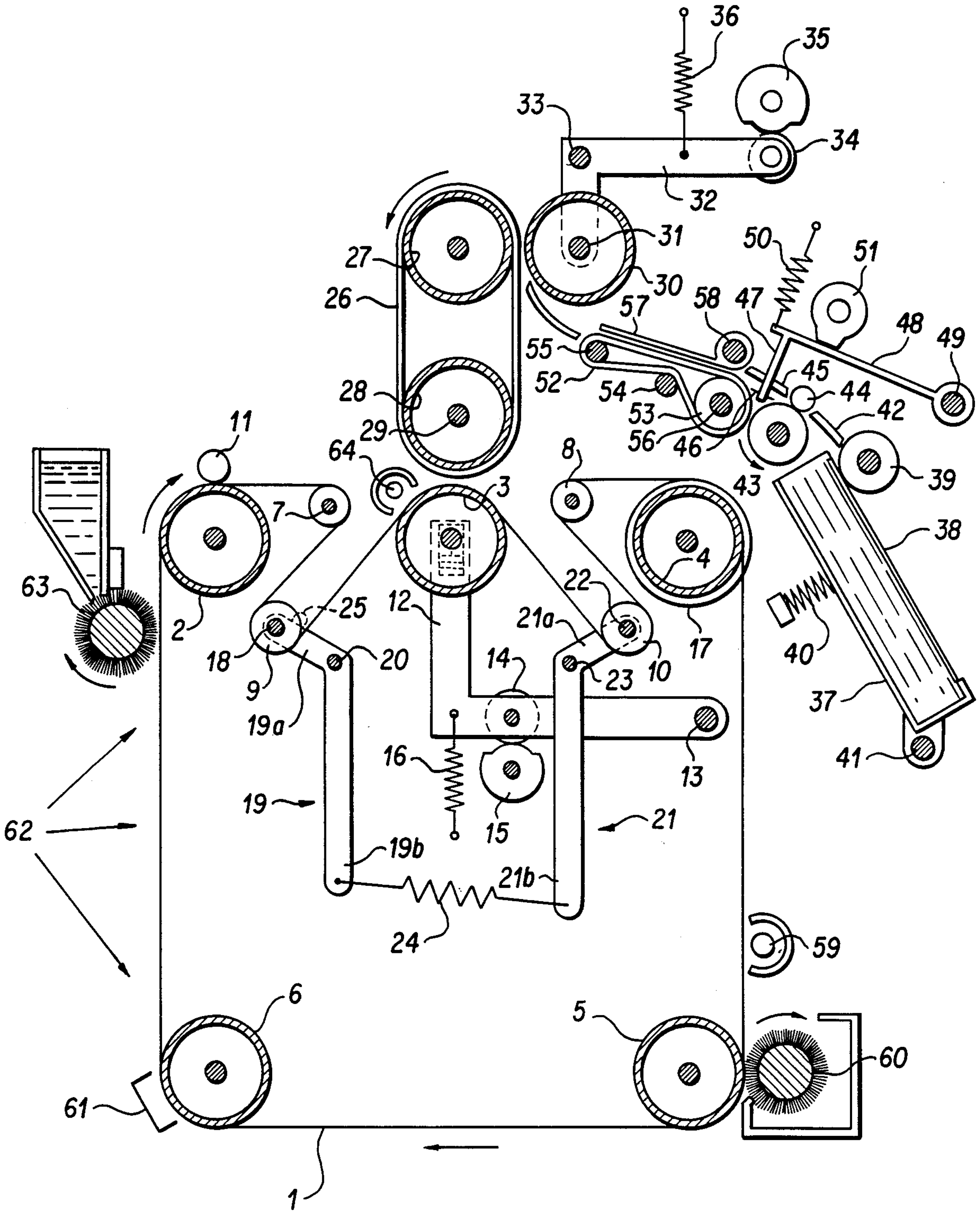
FIG. 1 is a diagrammatic cross-section of a copying machine showing the belt tensioning device of the present invention.

In FIG. 1, an endless photoconductive belt 1 is trained over a continuously rotating drive roller 2, a pressure roller 3, guide rollers 4, 5 and 6, auxiliary rollers 7 and 8 and floating rollers 9 and 10. With the aid of narrow rollers 11, which only engage the edges of belt 1, belt 1 is kept in contact with the surface of roller 2. In this way, belt 1 is driven with a speed of for instance 20 m/min. Pressure roller 3 is freely rotatably supported in bearings in arms 12 which can pivot about shaft 13. Each arm 12 is provided with cam follower 14 which cooperates with a cam 15 which is rotatably supported in bearings. Springs 16 exert a pulling force on the arms 12, so that cam follower 14 is continuously kept in contact with cam 15.

Guide roller 4 is continuously driven in the direction indicated with an arrow with a circumferential speed which is slightly lower than the speed of movement of belt 1, for instance with a circumferential speed of 19.8 m/min. Because of the difference in speed, belt 1 slips over the surface of roller 4. While using this slip, belt 1 is aligned with the aid of the guide plates 17 present on roller 4 at either side of belt 1, as more fully described in Dutch Patent Specification 148 418.

The invention provides two pairs of two-armed levers 19 and 21 having first arms **19*a* and 21*a*, respectively, and second arms 19*b* and 21*b*, respectively. Levers 19 and 21 are pivotably mounted to shafts 20 and 23**, respectively.

Guide rollers 5 and 6 and auxiliary rollers 7 and 8 are freely rotatably and supported in bearings. Floating roller 9 preferably consists of two narrow discs, engaging only the edges of belt 1. These discs are rotatably supported in bearings on rod 18, which is fixed to first arms **19*a* of levers 19. Floating roller 10 comprises similar discs which are freely rotatably and supported in bearings on shaft 22, which at either side is supported in bearings in first arms 21*a* of levers 21**.

Second arms **19*b* of levers 19 are connected by tension springs 24 to the second arms 21*b* of levers 21. For technological reasons associated with the construction it is possible to provide tensioning wires, which may run over pulleys, between the levers and the springs. Since the dimensions of levers 21 preferably differ from those of the levers 19 (the first arms 21*a* and 19*a* are, for example, each 50 mm long, the second arms 19*b* is preferably 95 mm and the second arm 21*b*** is preferably 100 mm), the transmission ratio of levers 21 is thus greater than that of levers 19 (about 5% for the given lengths).

Since tension springs 24 pull on second arms 19*b* and 21*b* with equal force, a greater force is exerted on floating roller 10 than on floating roller 9. In order to prevent floating roller 10 from completely cancelling the belt loop formed by floating roller 9, first arms 19a of levers 19 are limited in their movement by stop 25. Since the forces for tensioning the belt are derived from the tension spring system, floating rollers 9 and 10 can be made very light in weight. The tension spring used in the above-described example has a spring constant of 0.15 N/ mm, a prestressing of 2.35 N and a length, in the unloaded state, of about 70 mm. Any deviation within the tolerance limits does not affect operation.

Above pressure roller 3 an intermedate support is installed consisting of an endless belt 26 which is provided with a thin top layer which is manufactured of soft silicone rubber. Belt 26 is driven in the direction of the arrow by drive roller 27 with a speed which is slightly lower than that of belt 1, for example, at a speed of 19.8 m/min. Belt 26 is guided over a roller 28 which is freely rotatably supported in bearings. At the inside of roller 28 a heating element 29 is installed with which the cylinder of roller 28 and, consequently, belt 26 coming in contact with it is heated. With the aid of a generally known means (not shown) the energy supply to element 29 is controlled in such a way, that the temperature at the surface of belt 26 is constantly kept at, for instance, 105° C. At the side of driver roller 27 a pressure roller 30 is freely rotatably supported in bearings on shaft 31, which is connected to arms 32. These arms forms a rigid unit which is rotatably supported in bearings on shaft 33. As shown in FIG. 1, arm 32 is provided with a cam follower 34 which cooperates with rotatable cam 35.

In operation, the copying machine is provided with a supply of copy paper which includes tray 37 for receiving a stack of sheets 38. Tray 37 is provided with a friction roller 39 with the aid of which the sheets can be fed from stack 38 one after another. A spring 40 presses against tray 37 so that the top sheet of the stack is always head against roller 39 with a predetermined pressure while tray 37 swivels about shaft 41. A sheet fed from stack 38 is guided by guide plate 42 into the nip between the continuously rotating roller 43 and a disc roller 44 resting freely on roller 33. Into the joining passage between guide plates 45 and 46 extends a stop 47 which is connected to arms 48 fixed on a shaft 49 which is rotatably supported in bearings. The arm 48 is held continuously in contact with a cam 51 which is rotatably supported in bearings by the force exerted by springs 50.

Beyond stop 47 is an endless belt 52 which is tightened about freely rotatable rollers 53 and 54 and about a continuously rotating drive roller 55. Roller 55 drives belt 52 with a speed which is as high as or slightly higher (for instance 5% higher) than the speed of movement of belt 26. Inside roller 53 a known heating element 56 is provided with which the cylinder of roller 53 and, consequently, belt 52, is heated. Element 56 is controlled so that the temperature at the surface of belt 52 is constantly kept at a predetermined temperature, for instance, of 105° C. On belt 52 rests a flexible pressure plate 57, which is fixed to shaft 58 which is rotatably supported in bearings.

Along track followed by belt 1 means of the usual kind are installed in order to form powder images on the photoconductive surface of belt 1 via the xerographic process. These means comprise a light-source 59 with which any charges present on belt 1 are removed, a cleaning brush 60 with which any powder residues present on belt 1 are removed and a charging device 61 with which a uniform electrostatic charge is applied to belt 1. A projection station 62 is provided in which a light image of an original lying on an exposure plate is projected onto belt 1 with the aid of flash lamps, mirror(s) and an objective lens (not shown) during which projection of an image-wise charge pattern is formed on belt 1. A developing device 63 is provided to develop the charge pattern of belt 1 into a powder image. A light-source 64 is provided with which belt 1 is radiated for reducing the adhesion between image powder and belt 1.

Finally, the copying machine is provided with control means (not shown) with which the operation of the above-mentioned image-forming means 59–64, as well as the operation of cam 15, cam 35, friction roller 39 and cam 51 are synchronized. Control systems which can be used for this, are known in many kinds and many embodiments; a very suitable embodiment of such a system is for instance described in Dutch Patent Application 7311992.

When a powder image which was formed on belt 1 by successively charging, image-wise exposing and developing, approaches pressure roller 3, cam 15 is rotated through 180°, under influence of a signal emitted by the control system. Consequently arms 12 pivot and roller 3 is moved upwards. Belt 1 is thus pressed between the rollers 3 and 28 against belt 26. As a result of the friction then occurring, belt 1 at the place of the pressure zone accepts the slightly lower speed of belt 26. As belt 1 is driven by roller 2 with a constant and slightly higher speed, the loop in which roller 9 is positioned will increase. However, by the force exerted by spring 24 via lever 19, roller 9, pivoting swivels with arms 19*a*, will keep the loop tightened.

Since belt 1 is carried away with unchanged speed slipping over roller 4, the loop in which roller 10 is positioned will decrease and roller 10 will swivel with arms 21*a*. By the force exerted by spring 24 via lever 21 roller 10 will keep the belt tightened in the loop.

While the powder image passes through the pressure zone, it is pressed into the soft rubber layer of belt 26, and in this way it is transferred from belt 1 to belt 26, and is carried along by the latter. Although during this transfer a very great part (90–95%) of the image powder is transferred to belt 26, a residue is normally left on belt 1. This residue is removed later in the usual way by the operation of lamp 59 and brush 60. While being carried along by belt 26, the transferred powder image is heated from belt 26. During this heating the powder grains are softened and start coalescing, so that the image becomes sticky as it approaches pressure roller 30.

In the meantime the control system of the copying machine has also emitted signals with which first friction roller 39 has been activated in order to feed a sheet from stack 38 against stop 47, and with which subsequently cam 51 has been rotated through 180°. During rotation of the cam arms 48 swivel upwardly so that stop 47 is lifted. The sheet supplied is then pushed forward by rollers 43 and 44 and fed between belt 52 and plate 57. The sheet is then further conveyed by belt 52, during which it is heated so that upon approaching pressure roller 30, at least at the side with which it makes contact with belt 52, it has a temperature which is almost equal to the temperature of the image material supplied by belt 26. When the leading edge of the image present on belt 26 and the leading edge of the copy material have come in the neighborhood of roller 30, the control system of the copying machine emits a signal with which cam 35 is rotated through 180°.

As a result of the rotation of cam 35, arms 32 swivel about shaft 33 and roller 30 is pressed against belt 26. The image and the sheet of copy material pass through the pressure zone between roller 30 and belt 26, the softened and sticky image material is pressed onto the copy material. (This is the reason why when passing the pressure zone the whole image is separated from belt 26 and transferred to the copy material.) After cooling the image will have been firmly attached to the copy material and, thus, fixed thereon.

After the image formed on belt 1 has been transferred to belt 26 or to the copy sheet respectively, the control system of the copying machine emits signals with which the cams 15, 35 and 51, and, consequently, rollers 3 and 30, as well as stop 47, are again returned into their original positions. When roller 3 is released from belt 26, the force exerted by roller 10 will exceed the force of roller 9 since the transmission ratio of the levers 21 is greater than the transmission ratio of the levers 19 and as a consequence of this the loop formed by roller 10 will increase, and the loop formed by roller 9, will decrease. Roller 9 is moved upwards, until its movement is limited by stop 25. At that moment the two loops have again gone back to their original dimensions.

While a presently preferred embodiment of the invention has been shown and described in particularlity, it may be otherwise embodied within the scope of the appended claims.

What is claimed is:

1. In a device comprising a belt driven at a first speed, a revolving contact-pressure element driven at a second speed, means for bringing the belt into intermittently engagement with said contact-pressure element so as to be driven at said second speed at the point of engagement, and two floating rollers positioned in front of and after the point of engagement, respectively, for tensioning said belt, the improvements comprising:

A. two pairs of pivotable levers having first and second arms, each of said floating rollers being mounted in associated first arms of a pair of levers; and B. a tensioning spring means connecting each end of second arms of one of said pairs of levers to the end of the corresponding second arm of the other pair of said levers whereby the transmission ratio of one of said pairs of said levers differs from the transmission ratio of the other pair of said levers.

2. A device according to claim 1 including a stop means, whereby the movement of the floating roller mounted in the pair of levers having the smaller transmission ratio is limited by said stop.

3. A device according to claim 1 or 2, wherein forces for tensioning said belt are provided by said tension spring means.

4. A device according to claim 1 or 2, wherein the second arms on one of said pair of levers are longer than the second arms of said other pair of levers.

* * * * *